(12) United States Patent
Nam

(10) Patent No.: US 9,385,526 B2
(45) Date of Patent: Jul. 5, 2016

(54) INRUSH CURRENT SUPPRESSOR CIRCUIT

(71) Applicant: LG INNOTEK CO., LTD., Seoul (KR)

(72) Inventor: Won Seok Nam, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/368,231

(22) PCT Filed: Nov. 21, 2012

(86) PCT No.: PCT/KR2012/009869
§ 371 (c)(1),
(2) Date: Oct. 6, 2014

(87) PCT Pub. No.: WO2013/094886
PCT Pub. Date: Jun. 27, 2013

(65) Prior Publication Data
US 2015/0043257 A1 Feb. 12, 2015

(30) Foreign Application Priority Data
Dec. 22, 2011 (KR) ........................ 10-2011-0140580

(51) Int. Cl.
*H02H 9/00* (2006.01)
*H02M 7/06* (2006.01)
*H02M 1/32* (2007.01)
*H02H 1/00* (2006.01)

(52) U.S. Cl.
CPC ................ *H02H 9/002* (2013.01); *H02M 1/32* (2013.01); *H02M 7/062* (2013.01); *H02H 1/0038* (2013.01)

(58) Field of Classification Search
CPC ......... H02H 9/002; H02M 1/32; H02M 7/062
See application file for complete search history.

(56) References Cited

U.S. PATENT DOCUMENTS

| 5,095,261 A | 3/1992 | Schoofs |
| 5,420,780 A | 5/1995 | Bernstein et al. |
| 5,715,154 A | 2/1998 | Rault |
| 6,493,245 B1 * | 12/2002 | Phadke ................. H02H 9/001 323/908 |
| 7,379,311 B2 * | 5/2008 | Shih ....................... H02H 9/001 323/225 |
| 8,237,420 B2 * | 8/2012 | Liu ......................... H02H 9/001 323/277 |
| 2004/0136133 A1 | 7/2004 | Youm |
| 2012/0161522 A1 * | 6/2012 | Nam ....................... H02J 9/005 307/64 |

FOREIGN PATENT DOCUMENTS

| EP | 375020 A2 | 6/1990 |
| EP | 748035 A1 | 12/1996 |
| JP | H05-070193 U | 9/1993 |

OTHER PUBLICATIONS

International Search Report in International Application No. PCT/KR2012/009869, filed Nov. 21, 2012.

* cited by examiner

*Primary Examiner* — Jue Zhang
(74) *Attorney, Agent, or Firm* — Saliwanchik, Lloyd & Eisenschenk

(57) ABSTRACT

Disclosed is an inrush current suppressor circuit of a power supply circuit that supplies stand-by voltage from AC voltage. At a stand-by mode, only a diode and a resistor for suppressing inrush current are provided, and a capacitor provided in common between a stand-by power supply part and a start-up power supply part is charged, so that the inrush current is suppressed at both of stand-by and start-up modes and the number of devices of a circuit and power consumption are reduced.

6 Claims, 6 Drawing Sheets

INRUSH CURRENT SUPPRESSOR CIRCUIT

CROSS-REFERENCE TO RELATED APPLICATIONS

This application is the U.S. national stage application of International Patent Application No. PCT/KR2012/009869, filed Nov. 21, 2012, which claims priority to Korean Application No. 10-2011-0140580, filed Dec. 22, 2011, the disclosures of each of which are incorporated herein by reference in their entirety.

TECHNICAL FIELD

The disclosure relates to an inrush current suppressor circuit. More particularly, the disclosure relates to an inrush current suppressor circuit capable of suppressing inrush current at both of a stand-by mode and a start-up mode while reducing the number of diodes and resistors for suppressing the inrush current in a power supply circuit that can supply stand-by voltage from AC voltage.

BACKGROUND ART

An inrush current phenomenon refers to a phenomenon in which current higher than normal current flows at the moment in which power is applied. For example, the higher current may be current several times to several ten times greater than the normal current.

FIG. 1 is a circuit diagram showing an inrush current suppressor circuit according to the related art. Referring to FIG. 1, in order to use low stand-by power, AC voltage $V_{AC}$ is blocked from being applied to a resistor $R_{X,2}$ by using a switch SW1, thereby removing power consumption in the resistor $R_{X,2}$. In addition, for the purpose of power supply for stand-by voltage $V_{STBY}$, a diode $D_{ST1}$, an inrush current suppressing resistor $R_{ST1}$, and a smoothing capacitor $C_{IN\_ST}$ are additionally used.

In addition, a diode $D_{Inrush}$ by-passes the inrush current of a typical boost converter so that the inrush current is prevented from flowing through an inductor $L_m$ and a diode $D_o$, and suppresses the intensity of the inrush current applied to a resistor $R_{Inrush1}$. However, current inevitably flows through the resistor $R_{Inrush1}$ even when the circuit of FIG. 1 is operated at a start-up mode, so that the power loss occurs at the resistor $R_{Inrush1}$, thereby not only exerting an undesirable influence on the whole power efficiency of the circuit, but also greatly heating parts.

FIG. 2 is a circuit diagram showing the current flow at the stand-by mode of the inrush current suppressor circuit according to the related art. Referring to FIG. 2, if the AC voltage $V_{AC}$ is applied at the stand-by mode, only when live potential is higher than neutral potential, current may be applied to a stand-by capacitor $C_{in\_st}$ through a stand-by diode $D_{st1}$ and a stand-by resistor $R_{st1}$. If the voltage is returned to the neutral potential through a rectifying part BD1 and the inrush current suppressing resistor $R_{inrush1}$, the circuit may be operated as a half-wave rectifier circuit in which the stand-by capacitor is charged. Due to the power charged in the above manner, stand-by voltage $V_{STBY}$ may be generated from a stand-by power supply part STBY. In this case, since zero voltage is applied to the resistor $R_{x,2}$, power consumption by the resistor $R_{x,2}$ is not caused.

FIG. 3 is a circuit diagram showing the current flow of the inrush current suppressor circuit according to the related art when the power is started up. As shown in FIG. 3, the switch SW1 is turned on in order to change the whole circuit from the stand-by mode to the normal mode. The AC voltage $V_{AC}$ is applied upon the conduction of the switch SW1, so that current is applied to a start-up capacitor $C_o$ having the initial voltage of 0V. Thereafter, if a main switch M1 is turned on, a start-up power supply part MULTI is operated, so that an output voltage $V_{out}$ required in the system may be generated. In this case, as current flows through the inrush current suppressing resistor $R_{inrush1}$, undesirable power consumption may be caused.

In other words, since the inrush current suppressing diode and the inrush current suppressing resistor are provided for each of the stand-by mode and the start-up mode, the number of parts may be increased, and the power consumption by the inrush current suppressing resistor may serve as a problem.

DISCLOSURE OF INVENTION

Technical Problem

The disclosure provides an inrush current suppressor circuit capable of reducing the number of parts without power loss when comparing with a conventional circuit.

Solution to Problem

According to the embodiment, there is provided an inrush current suppressor circuit of a power supply circuit which supplies a stand-by voltage from an AC voltage. The inrush current suppressor circuit includes a switch to change a power supply mode to a stand-by mode when the switch is turned off, a stand-by power supply part to generate the stand-by voltage from the AC voltage, an inrush current suppressing diode connected to the stand-by power supply part in series when the switch is turned off, an inrush current suppressing resistor connected to the inrush current suppressing diode in series, and a common capacitor connected to the stand-by power supply part such that voltage is applied to the common capacitor at the stand-by mode.

Advantageous Effects of Invention

As described above, the disclosure can provide the inrush current suppressor circuit capable of reducing the manufacturing cost and improving the power efficiency as the number of the parts is reduced.

BEST MODE FOR CARRYING OUT THE INVENTION

Hereinafter, the embodiment will be described with reference to accompanying drawings.

Figure 1:
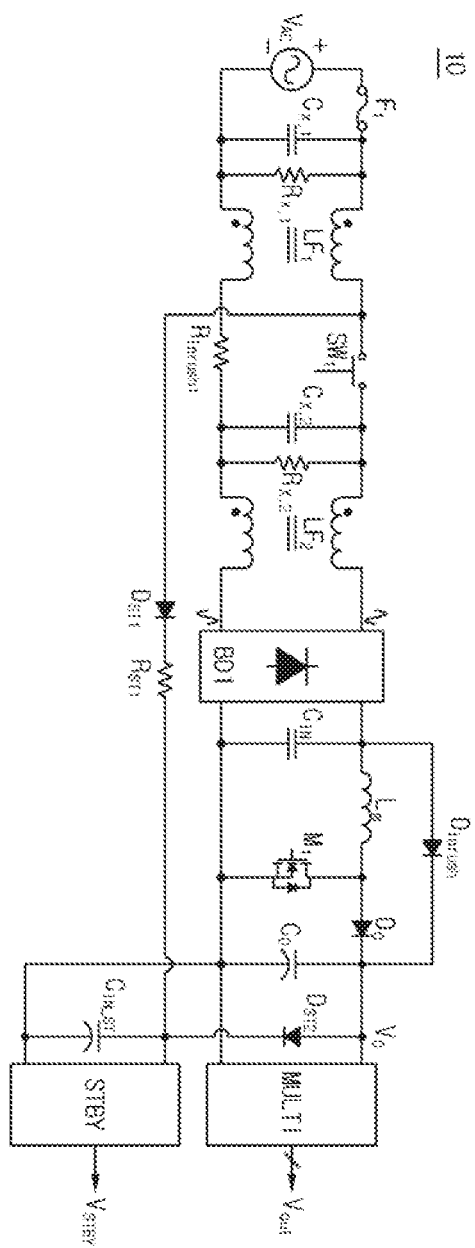
FIG. 1 is a circuit diagram showing an inrush current suppressor circuit according to the related art.
Figure 2:
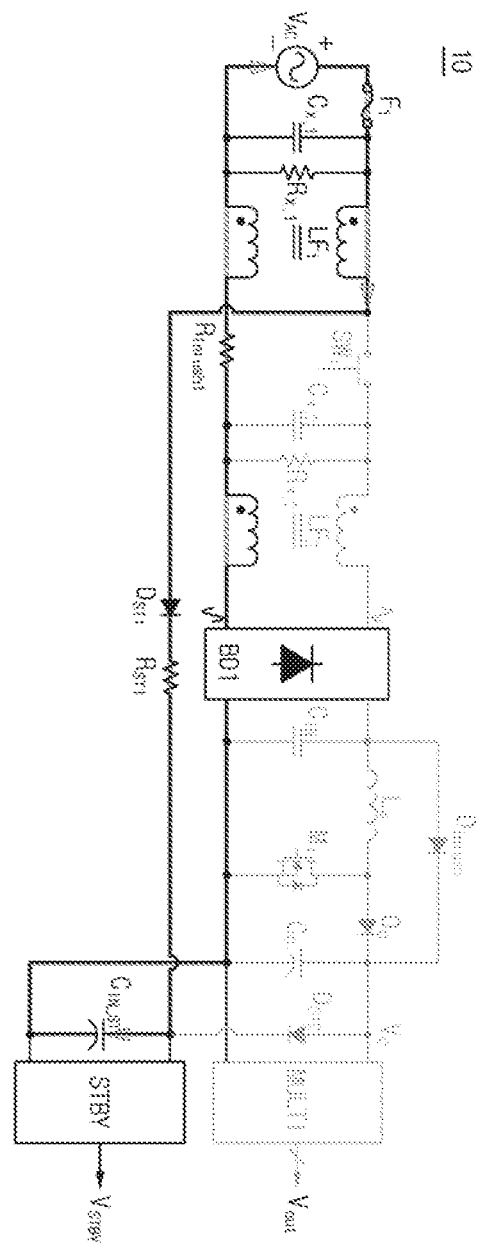
FIG. 2 is a circuit diagram showing the current flow at a stand-by mode of the inrush current suppressor circuit according to the related art.
Figure 3:
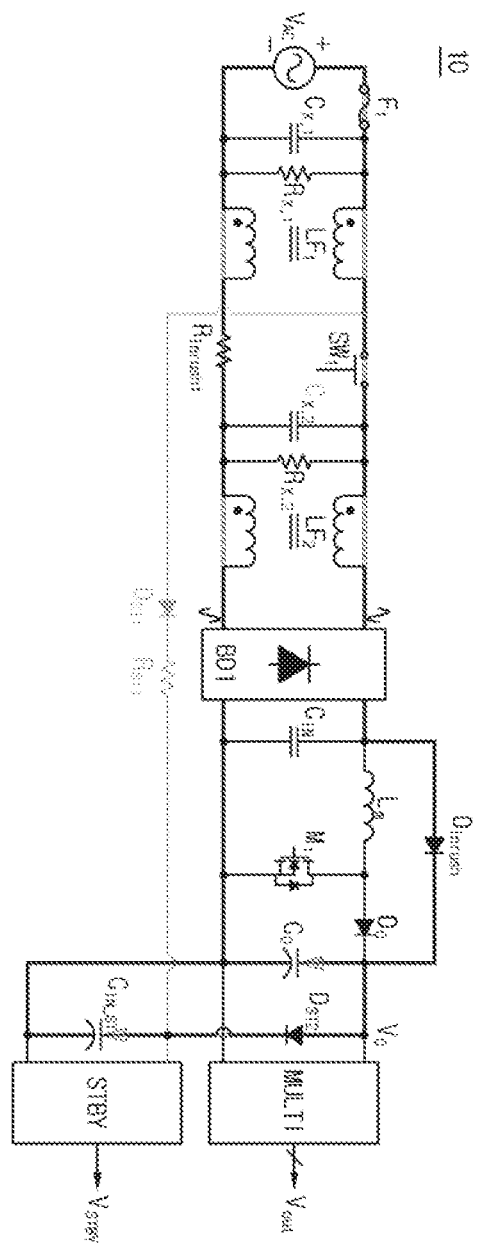
FIG. 3 is a circuit diagram showing the current flow of the inrush current suppressor circuit according to the related art when power is started up.
Figure 4:
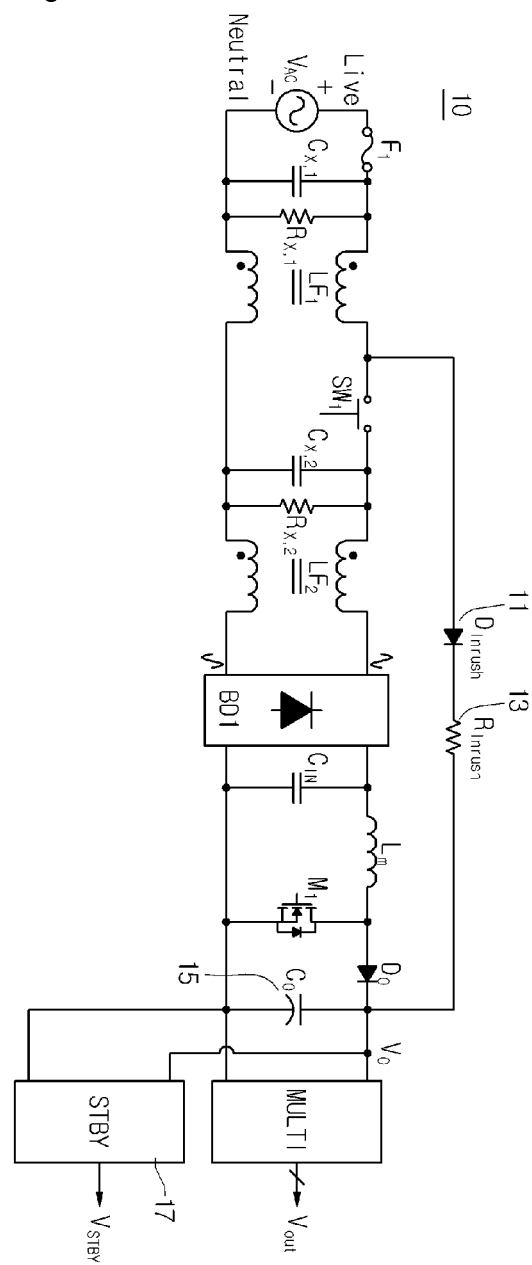
FIG. 4 is a circuit diagram showing an inrush current suppressor circuit according to one embodiment.

FIG. 4 is a circuit diagram showing an inrush current suppressor circuit 10 according to one embodiment.

Referring to FIG. 4, the inrush current suppressor circuit 10 according to one embodiment may serve as an inrush current suppressor circuit of a power supply circuit capable of supplying stand-by voltage $V_{STBY}$ from AC voltage $V_{AC}$. The inrush current suppressor circuit 10 includes a switch $SW_1$ to change a power supply mode to a stand-by mode in an off-operation, a stand-by power supply part 17 to generate the stand-by voltage $V_{STBY}$ from the AC voltage $V_{AC}$, an inrush current suppressing diode 11 connected to the stand-by power supply part 17 when the switch SW1 is turned off, an inrush current suppressing resistor 13 connected to the inrush current suppressing diode 11 in series, and a common capacitor 15 connected to the stand-by power supply part 17 so that the common capacitor 15 receives voltage and is charged with the voltage at the stand-by mode.

As shown in FIG. 4, different from an inrush current suppressor circuit according to the related art, the inrush current suppressor circuit 10 according to one embodiment includes only the inrush current suppressing resistor 13 and the inrush current suppressing diode 11 connected to the stand-by power supply part 17. In other words, similarly to the inrush current suppressor circuit according to the related art, the inrush current suppressor circuit 10 according to one embodiment can suppress inrush current without a diode $D_{st1}$, a resistor $R_{st1}$, and a stand-by capacitor $C_{in\_st}$. In addition, according to the embodiment, the manufacturing cost can be reduced by removing devices mounted according to the related art, and undesirable power loss caused at the conventional resistor $R_{inrush1}$ can be removed. In addition, only one capacitor is provided for the stand-by power supply part 17 and a start-up power supply part MULTI by integrating conventional capacitors connected to the stand-by power supply part 17 and the start-up power supply part MULTI, respectively, into the common capacitor $C_o$ while both of the stand-by mode and the start-up mode can be operated. The details of the stand-by mode and the start-up mode will be described below.

Figure 5:
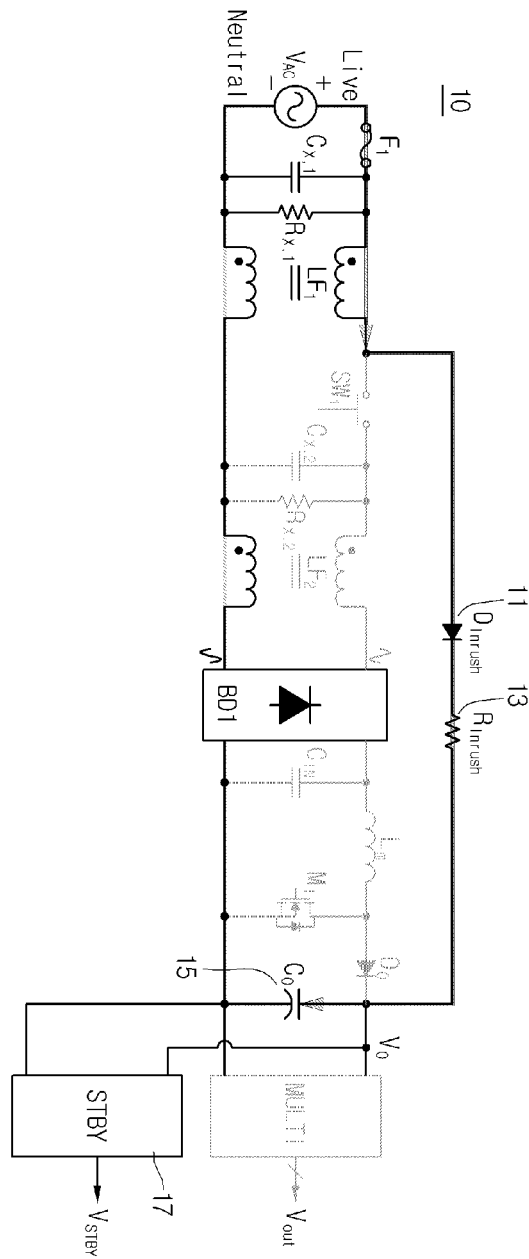
FIG. 5 is a circuit diagram showing the current flow of the inrush current suppressor circuit according to one embodiment at a stand-by mode.

FIG. 5 is a circuit diagram showing the current flow of the inrush current suppressor circuit according to one embodiment at the stand-by mode. If the AC voltage $V_{AC}$ is applied, as the switch SW1 is turned off, current from the AC voltage $V_{AC}$ flows through the inrush current suppressing diode 11 and the inrush current suppressing resistor 13.

The switch SW1 allows the current to be applied to the common capacitor $C_o$ through the inrush current suppressing diode $D_{inrush}$ and the inrush current suppressing resistor $R_{inrush}$ if the live potential is higher than the neutral potential. Accordingly, the inrush current suppressor circuit 10 may be operated as a half-wave rectifying circuit in which energy is charged in the common capacitor $C_o$. In addition, since current does not flow through a resistor $R_{x,2}$ due to the turn-off of the switch SW1, the power consumption is not caused by the resistor $R_{x,2}$. The stand-by power supply part 17 may generate the stand-by voltage $V_{STBY}$ due to the energy charged in the common capacitor $C_o$. In other words, the inrush current suppressor circuit 10 according to one embodiment may be operated in such a manner that the current from the AC voltage $V_{AC}$ passes through the inrush current suppressing diode $D_{inrush}$ and the inrush current suppressing resistor $R_{inrush}$, and the common capacitor $C_o$ is charged by the current from the AC voltage $V_{AC}$ at the stand-by mode.

Figure 6:
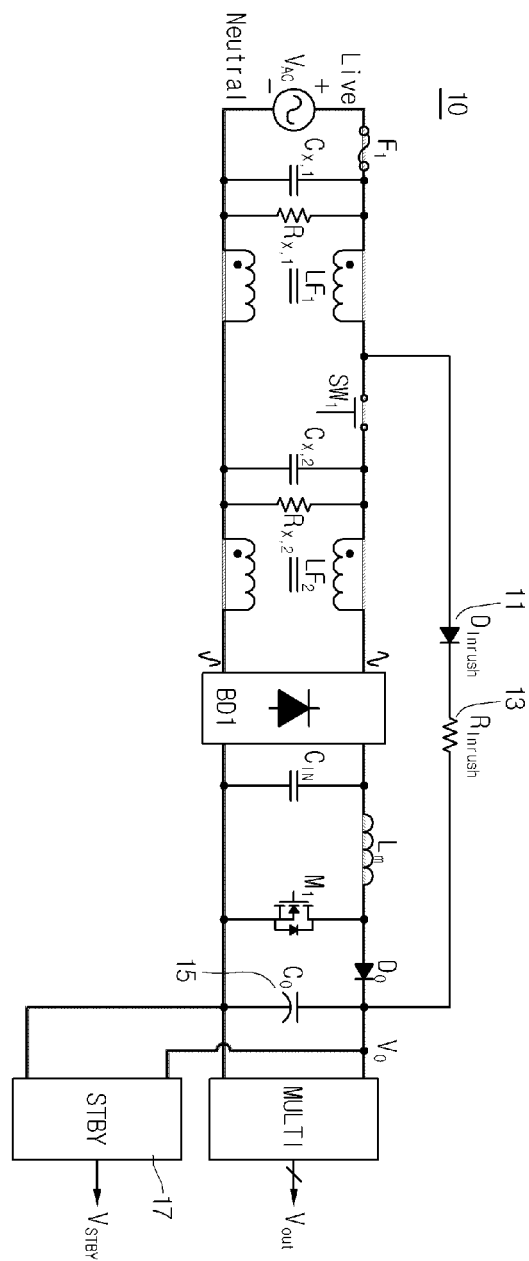
FIG. 6 is a circuit diagram showing the current flow of the inrush current suppressor circuit according to one embodiment at a start-up mode.

FIG. 6 is a circuit diagram showing the current flow of the inrush current suppressor circuit according to one embodiment at the start-up mode. As shown in FIG. 6, if the switch SW1 is conducted, the current from the AC voltage $V_{AC}$ may flow through a start-up inductor $L_m$ and a start-up diode $D_o$ without flowing the inrush current suppressing diode $D_{inrush}$ and the inrush current suppressing resistor $R_{inrush}$. In addition, the current may be applied to both of the stand-by power supply part 17 and the start-up power supply part MULTI sharing the common capacitor $C_o$ together. Meanwhile, the start-up power supply part MULTI is operated by a main switch M1, and the main switch M1 is operated only when the common capacitor $C_o$ connected to the main switch M1 has the voltage equal to or greater than predetermined voltage. Since the common capacitor $C_o$ is previously charged at the stand-by mode as described above, the main switch M1 may be instantly operated. In this case, since the inrush current suppressing resistor $R_{inrush}$ 13 is not on a current loop, the additional power loss can be removed from the inrush current suppressor circuit 10 according to one embodiment, and the heat emitted from the circuit can be reduced.

In other words, even through the inrush current suppressing resistor $R_{inrush}$ is not provided on the current loop at the start-up mode, the inrush current can be suppressed at the start-up mode by allowing the common capacitor $C_o$ to be shared between the start-up power supply part MULTI and the stand-by power supply part 17.

In addition, since it is unnecessary to arrange an additional resistor on a current loop at the start-up mode, the number of parts can be reduced, but also the power consumption can be reduced by the resistor.

As described above, the inrush current suppressor circuit according to one embodiment has been described. The circuits shown in accompanying drawings are provided only for the illustrative purpose of a power supply circuit to which the inrush current suppressor circuit according to one embodiment is applied. The disclosure is applicable to various circuits including the subject matter claimed in the appended claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An inrush current suppressor circuit of a power supply circuit that supplies a stand-by voltage from an AC voltage, the inrush current suppressor circuit comprising:

a switch to change a power supply mode to a stand-by mode when the switch is turned off;

a stand-by power supply part generating the stand-by voltage from the AC voltage;

an inrush current suppressing diode connected to the stand-by power supply part in series when the switch is turned off;

a common capacitor connected to the stand-by power supply part such that a charging voltage is applied to the common capacitor at the stand-by mode;

an inrush current suppressing resistor connected in series with the inrush current suppressing diode and the common capacitor, wherein two terminals of the inrush current suppressing resistor are connected with the inrush current suppressing diode and the common capacitor, respectively; and
a start-up power supply part connected to the common capacitor,
wherein the start-up power supply part and the stand-by power supply part share the common capacitor, and
wherein a main switch for operating the start-up power supply part is turned on by a charged voltage of the common capacitor.

2. The inrush current suppressor circuit of claim 1, wherein a current from the AC voltage passes through the inrush current suppressing resistor and the inrush current suppressing diode, and the common capacitor is charged with the current from the AC voltage at the stand-by mode.

3. The inrush current suppressor circuit of claim 1, wherein the power supply circuit is operated at a start-up mode when the switch is turned on, and wherein the switch is turned on at the start-up mode, and an inrush current is suppressed by the common capacitor.

4. A power supply apparatus comprising:
an input part to rectify an AC voltage applied thereto;
a main power supply part to receive an input voltage from the input part to generate a main voltage;
a stand-by power supply part to receive the input voltage from the input part to generate a stand-by voltage; and
a current suppressing part to suppress an inrush current applied to the stand-by power supply part;
wherein the current suppressing part comprises an inrush current suppressing resistor connected in series with an inrush current suppressing diode and a common capacitor, and
wherein two terminals of the inrush current suppressing resistor are connected with the inrush current suppressing diode and the common capacitor, respectively;
wherein the current suppressing part includes:
a switch to change a power supply mode to a stand-by mode when the switch is turned off;
the inrush current suppressing diode connected to the stand-by power supply part in series when the switch is turned off; and
the common capacitor connected to the stand-by power supply part such that a charging voltage is applied to the common capacitor at the stand-by mode;
wherein the main power supply part is connected to the common capacitor,
wherein the main power supply part and the stand-by power supply part share the common capacitor together, and
wherein a main switch to operate the main power supply part is turned on by a charged voltage of the common capacitor.

5. The power supply apparatus of claim 4, wherein a current from the AC voltage passes through the inrush current suppressing resistor and the inrush current suppressing diode, and the common capacitor is charged with the current from the AC voltage at the stand-by mode in which the switch is turned off.

6. The power supply apparatus of claim 4, wherein the power supply apparatus is operated at a start-up mode when the switch is turned on, and wherein the switch is turned on at the start-up mode, and the inrush current is suppressed by the common capacitor.

* * * * *